United States Patent
Lee et al.

(10) Patent No.: US 9,181,114 B2
(45) Date of Patent: Nov. 10, 2015

(54) MINERALOGICAL REMOVAL METHOD AND APPARATUS FOR HIGHLY CONCENTRATED IODINE IN RADIOACTIVE WASTEWATER

(71) Applicant: KOREA ATOMIC ENERGY RESEARCH INSTITUTE, Daejeon (KR)

(72) Inventors: Seung Yeop Lee, Daejeon (KR); Ji Young Lee, Daejeon (KR); Jong Tae Jeong, Daejeon (KR); Kyung Su Kim, Seoul (KR)

(73) Assignee: Korea Atomic Energy Research Institute, Daejeon (KR)

( * ) Notice: Subject to any disclaimer, the term of this patent is extended or adjusted under 35 U.S.C. 154(b) by 0 days.

(21) Appl. No.: 14/533,836

(22) Filed: Nov. 5, 2014

(65) Prior Publication Data

US 2015/0191376 A1    Jul. 9, 2015

(30) Foreign Application Priority Data

Jan. 9, 2014  (KR) .................. 10-2014-0002668

(51) Int. Cl.
```
C02F 1/52        (2006.01)
C02F 1/70        (2006.01)
C02F 101/12      (2006.01)
C02F 101/00      (2006.01)
```
(52) U.S. Cl.
CPC ............. *C02F 1/5245* (2013.01); *C02F 1/5281* (2013.01); *C02F 1/70* (2013.01); *C02F 2101/006* (2013.01); *C02F 2101/12* (2013.01)

(58) Field of Classification Search
CPC ................................................. C02F 1/5245
See application file for complete search history.

(56) References Cited

U.S. PATENT DOCUMENTS 4,180,476 A * 12/1979 Anav et al. ............... 252/636
5,352,367 A * 10/1994 Ochiai et al. ............. 210/719

FOREIGN PATENT DOCUMENTS

KR     1020100030250 A    3/2010

* cited by examiner

*Primary Examiner* — Tony G Soohoo
*Assistant Examiner* — Peter Keyworth
(74) *Attorney, Agent, or Firm* — Alleman Hall McCoy Russell & Tuttle LLP (57) ABSTRACT

Provided are a mineralizing removal method and apparatus for highly concentrated iodine in radioactive wastewater. According to the present invention, since only a small amount of sludge is discharged as compared to the previous treatment methods, a generation amount of the radioactive waste may be significantly decreased, such that wastewater containing highly or ultra-highly concentrated iodine may also be effectively treated. Further, only iodine may be selectively removed regardless of the presence of competitive anions in the wastewater. Treatment may be performed under a neutral or weak alkaline condition rather than an acidic condition, such that a volatilization of radioactive iodine was fundamentally blocked, and at the time of discharging the wastewater, a neutralization treatment process is not required. In addition, long term storage stability of radioactive waste may be significantly promoted by using phase-conversion of malachite and an iodine crystallization method as compared to the previous adsorption methods.

4 Claims, 3 Drawing Sheets

FIG. 5

MINERALOGICAL REMOVAL METHOD AND APPARATUS FOR HIGHLY CONCENTRATED IODINE IN RADIOACTIVE WASTEWATER

CROSS-REFERENCE TO RELATED APPLICATIONS

This application claims priority under 35 U.S.C. §119 to Korean Patent Application No. 10-2014-0002668, filed on Jan. 9, 2014, in the Korean Intellectual Property Office, the disclosure of which is incorporated herein by reference in its entirety.

TECHNICAL FIELD

The following disclosure relates to a mineralogical removal method and apparatus for highly concentrated iodine in radioactive wastewater capable of effectively mineralizing iodine using a redox reaction and an inorganic crystallization reaction in wastewater containing radioactive iodine.

More particularly, the following disclosure relates to a mineralogical removal method and apparatus for highly concentrated iodine in radioactive wastewater capable of economically and rapidly treating iodine in wastewater by supplying a stabilizer, a copper ion source, and a mineralization catalyst.

BACKGROUND

A concern about radioactive materials has increased in Korea due to the Fukushima nuclear power plant accident in Japan. However, in fact, since the radioactive materials are used in fields such as nuclear power generation or nuclear weapons but used in hospitals, the radioactive materials are not always harmful. Particularly, a treatment method for thyroid cancer using a radioactive iodine isotope based on characteristics of thyroid cells absorbing iodine to thereby be differentiated, which is one of the treatment methods that are mainly used at present, has significantly contributed to increasing a complete cure rate of thyroid cancer. However, it is difficult to treat and dispose the radioactive material as the same method of general waste, the development of a technology of safely treating radioactive wastewater or materials generated after using radioactive isotopes in the nuclear power plants or hospitals has been demanded.

As the radioactive iodine, there are various kinds of isotopes, but the radioactive iodine exists in wastewater as iodine-125, iodine-129, iodine-131, iodine-132, iodine-133, or the like. Among them, iodine-131, iodine-132, and iodine-133, and the like, have short half-lives, such that radioactivity may be attenuated by storing the wastewater for a predetermined period. However, since a generation amount of radioactive wastewater containing iodine compounds is excessively large, realistically, there is a limitation in storing the wastewater itself in a water collecting tank for a long time. In addition, a half-life of iodine-125 emitting low energy gamma rays to thereby be used for medical applications is 60 days, which is not short, and in consideration of stability depending on the half-life, iodine-125 should be stored for 2 years or more. Further, in the case of iodine-129, a half-life thereof is 15.7 million years, such that attenuation of radioactivity by storing iodine-129 is almost impossible, and in the case of intake of iodine-129 in a human body, iodine-129 becomes concentrated in the human body and continuously releases radiation, such that iodine-129 is significantly harmful.

As the existing treatment method of radioactive wastewater in order to solve the problems as described above, there are a solidification treatment method, an ion exchange resin method, a coagulation precipitation method, and the like.

The solidification treatment method is a method of adding iodine into a material capable of being solidified such as asphalt, or the like, to block iodine. However, in this case, there is a disadvantage in that at the time of solidification treatment, iodine molecules or organic iodine compounds is easily emitted by internal heat in materials.

Further, in the ion exchange resin method, iodine is adsorbed and separated by filtering wastewater through an ion exchange resin, but there are disadvantages in that iodine removal efficiency is low, a large amount of waste is generated, which increase cost, and it is not easy to store the large amount of waste.

The coagulation precipitation method is a method of converting iodine into silver iodide by adding silver nitrate into wastewater and then precipitating the silver iodide, but there is a problem in that since a cost of silver nitrate is significantly high, a treatment cost is excessively consumed.

Otherwise, there is a method of using activated carbon as in Korean Patent No. 10-1046433, but similarly to the ion exchange resin method, there is a disadvantage in that it is difficult to adsorb and separate an iodide oxide. In addition, since the activated carbon should be frequently replaced, a replacement cost is high, and a volume of waste activate carbon or waste ion exchange resin in which radioactive iodine is adsorbed is large, such that a separate treatment space is required, and cost is also increased. Further, in the case in which wastewater contains highly concentrated radioactive iodine, there is a limitation in using the above-mentioned adsorption method.

SUMMARY

An embodiment of the present invention is directed to providing a mineralizing removal method for highly concentrated iodine capable of effectively and rapidly treating highly concentrated radioactive iodine in wastewater.

Another embodiment of the present invention is directed to providing a mineralizing removal method and apparatus for highly concentrated iodine in radioactive wastewater capable of selectively removing only iodine even in the presence of competitive anions in wastewater.

Another embodiment of the present invention is directed to providing a mineralizing removal method and apparatus for highly concentrated iodine in radioactive wastewater capable of easily keeping and storing waste sludge for a long period time by minimizing an amount of the waste sludge.

The present invention relates to a mineralizing removal method and apparatus for highly concentrated iodine in radioactive wastewater.

In one general aspect, a mineralizing removal method for highly concentrated iodine in radioactive wastewater includes:

a) injecting a reducing agent into wastewater containing radioactive iodine in an anoxic tank to prepare anaerobic wastewater;

b) injecting a stabilizer and a copper ion source into the anaerobic wastewater to form malachite nanoparticles;

c) injecting an iodine mineralization catalyst into the wastewater in step b) to phase-convert the malachite nanoparticles into copper iodide and grow a crystal; and d) separating the copper iodide from purified wastewater.

In another general aspect, a mineralizing removal apparatus for highly concentrated iodine in radioactive wastewater includes:

an anoxic tank into which wastewater containing radioactive iodine is introduced;

a malachite formation tank connected to the anoxic tank so that wastewater in an anaerobic state is introduced thereinto, and supplied with a bicarbonate stabilizer and a copper ion source; and a precipitation tank connected to the malachite formation tank so that malachite particles and wastewater are introduced thereinto, and supplied with an iodine mineralization catalyst, wherein the malachite particles are phase-converted into copper iodide by the iodine mineralization promoter in the precipitation tank, such that the radioactive iodine in the wastewater is removed as copper iodide sludge.

Other features and aspects will be apparent from the following detailed description, the drawings, and the claims.

DETAILED DESCRIPTION OF MAIN ELEMENTS

110: anoxic tank
111: reducing agent storage tank
120: malachite formation tank
121: stabilizer storage tank
122: copper ion source storage tank
130: precipitation tank
131: mineralization catalyst storage tank
132: sludge storage tank
133: stirrer
10: first transfer pipe
20: first pump
30: second transfer pipe
40: second pump
50: purification water discharge pipe
60: purification water discharge pump
70: sludge discharge pipe
80: sludge discharge pump
90: radioactive wastewater transfer pipe
200: control unit

DETAILED DESCRIPTION OF EMBODIMENTS

Hereinafter, a mineralizing removal method and apparatus for highly concentrated iodine in radioactive wastewater will be described in more detail through a detailed example or exemplary embodiment including the accompanying drawing. However, the following detailed example or exemplary embodiment is only to specifically explain the present invention, but the present invention is not limited thereto and may be implemented in various forms.

In addition, unless defined otherwise in the specification, all the technical and scientific terms used in the specification have the same meanings as those that are generally understood by those skilled in the art. The terms used in the specification are only to effectively describe a specific exemplary embodiment, but are not to limit the present invention.

Further, the accompanying drawings to be described below are provided by way of example so that the idea of the present invention can be sufficiently transferred to those skilled in the art to which the present invention pertains. Therefore, the present invention is not limited to the drawings to be provided below, but may be modified in many different forms. In addition, the drawings to be provided below may be exaggerated in order to clarify the scope of the present invention. Like reference numerals denote like elements throughout the specification.

In addition, unless the context clearly indicates otherwise, it should be understood that a term in singular form used in the specification and the appended claims includes the term in plural form.

The mineralizing removal method for highly concentrated iodine in radioactive wastewater according to the present invention includes:

a) injecting a reducing agent into wastewater containing radioactive iodine in an anoxic tank to prepare anaerobic wastewater;

b) injecting a stabilizer and a copper ion source into the anaerobic wastewater to form malachite nanoparticles;

c) injecting an iodine mineralization catalyst into the wastewater in step b) to phase-convert the malachite nanoparticles into copper iodide and grow a crystal; and d) separating the copper iodide from purified wastewater, wherein step a) is performed in the anoxic tank into which wastewater containing radioactive iodine and the reducing agent are introduced, and the wastewater in an anaerobic state subjected to step a) is induced into a malachite formation tank. In addition, the wastewater in the anaerobic state introduced into the malachite formation tank contacts a bicarbonate stabilizer and the copper ion source to form the malachite nanoparticles as in step b). In addition, the wastewater subjected to step b) is introduced into a precipitation tank supplied with the iodine mineralization catalyst, such that the malachite particles are phase-converted into copper iodide by the mineralization catalyst, such that the radioactive iodine in the wastewater is removed as copper iodide sludge.

In the mineralizing removal method for highly concentrated iodine in radioactive wastewater according to the present invention, a nano-crystallization technology is applied, such that radioactive iodine contained in the wastewater may be effectively removed. In detail, the malachite nanoparticles may be formed by injecting the bicarbonate stabilizer and the copper ion after injecting the reducing agent in a state in which oxygen is blocked to allow wastewater to be in the anaerobic state. Further, the iodine mineralization promoter is further injected thereto, such that reduced copper ions selectively and very strongly bind with radioactive iodine, thereby being precipitated as copper iodide.

In addition, the mineralizing removal method for highly concentrated iodine in radioactive wastewater according to the present invention has advantages in that the radioactive wastewater may be economically and rapidly purified using significantly simple devices including only the anoxic tank, the malachite formation tank, and the precipitation tank, and even though other anions ($Cl^-$, $CO_3^{2-}$, $SO_4^{2-}$, or the like) are present in the wastewater, iodide anions may be selectively removed, thereby obtaining significantly excellent efficiency and selectivity. In addition, as iodine nuclides contained in the wastewater is removed as the significantly stable crystalline mineral (copper iodide), a disposal volume of secondary radioactive wastes generated during a purification process of the wastewater may be significantly small, and at the same time, long term disposal stability of the secondary radioactive wastes may be increased. Further, since the radioactive iodine is removed in a solid phase by the nano-crystallization technology, high level radioactive wastewater containing highly concentrated radioactive iodine may be treated, and treatment efficiency may be high. In addition, since a pH of the wastewater is maintained in an almost neutral state during the purification process, there is no need for a pH adjusting process for adjusting the pH in order to discharge the wastewater from which radioactive nuclides are removed, and since the radioactive wastewater may be purified by a significantly simple configuration of allowing the wastewater to be in an anaerobic state and removing the radioactive iodine as the crystalline mineral using the nano-crystallization technology, exposure of radioactivity may be minimized, and automatic operation may be performed.

In the mineralizing removal method for highly concentrated iodine in radioactive wastewater according to an exemplary embodiment of the present invention, the radioactive wastewater, which is a treatment object, may contain radioactive iodine (iodine nuclides) having a concentration of 1 mM or more and iodine nuclides having a radiation dose of up to 1,000 Bq/ml. In this case, the radioactive iodine (iodine nuclides) may be one or at least two species selected from iodide ion ($I^-$), iodate ion ($IO_3^-$), and iodine ($I_2$).

The radioactive iodine may be present in the wastewater in forms (chemical species) of iodate ion ($IO_3^-$) and iodine ($I_2$) as well as a form (chemical species) of iodide ion. In the case of removing the radioactive iodine in wastewater using activated carbon or an ion exchange resin as in the related art, removal efficiency is significantly changed according to the form of iodine nuclides present in the wastewater, such that there is a limitation in removing various kinds of radioactive iodine. However, the mineralizing removal method for highly concentrated iodine in radioactive wastewater according to an exemplary embodiment of the present invention has an advantage in that the various chemical species of the radioactive iodine contained in the wastewater may be entirely removed using the nano-crystallization technology of forming the malachite nanoparticles in the anaerobic state and phase-converting the malachite nanoparticles into copper iodide.

In step a), the reducing agent is to change the wastewater into the anaerobic state so that the bicarbonate stabilizer injected into the malachite formation tank prevents an excessive change in a hydrogen ion concentration and maintains the pH at a stable level to thereby maintain acid-base balance of the wastewater, and any reducing agent may be used as long as it is used for forming an anaerobic state in a general water treatment field. As a specific and non-restrictive example, the reducing agent may be one or two or more chemicals selected from a group consisting of oxalic acid, formic acid, sodium sulfite, and sodium hydrogen sulfite.

An amount of reducing agent is an amount at which the reducing agent may remove dissolved oxygen in the wastewater and convert oxidized iodine (for example, $IO_3^-$, or $I_2$) into reduced iodine ($I^-$). In detail, it is preferable that the reducing agent injected into the wastewater is injected at a concentration (concentration of the reducing agent) equal to or more than a sum of concentrations of the oxidized iodine and the dissolved oxygen in the wastewater. As a specific and non-restrictive example, the reducing agent may be injected so as to have a concentration of 0.01 to 100 mM.

The malachite nanoparticles may be formed by injecting the bicarbonate stabilizer and the copper ion into the wastewater changed into the anaerobic state by injecting the reducing agent as in step b). Precipitation of malachite will be described in more detail as follows. First, in the case of injecting the stabilizer in the wastewater in the anaerobic state in which oxygen does not almost exist, bicarbonate is dissolved in the wastewater to thereby maintain the pH at a neutral or weak alkaline condition. Since in the wastewater under an acidic condition, there is a risk that the radioactive iodine will be partially vaporized to thereby be volatilized in a gas form, it is essential to maintain the pH at neutral or alkaline condition. In the case of injecting the copper ion source thereinto, the copper ion source reacts with bicarbonate in the wastewater, such that the malachite ($Cu_2(OH)_2CO_3$) particles having a nano size may be formed.

The stabilizer, which is to form a condition at which bicarbonate ($HCO_3^-$) ions are dissolved in the wastewater in the anaerobic state, acts similarly to a bicarbonate buffer, which is one of acid-base balance adjusting agents. In more detail, as one of the mechanisms for maintaining a pH in a body at a constant range in order to maintain homeostasis in the body, in order to prevent the wastewater from being acidified by injection of the reducing agent, hydrogen ions existing in the wastewater are removed by injecting a reagent capable of releasing bicarbonate ions, and as a result, the reagent serves to neutralize pH of the wastewater.

As the bicarbonate stabilizer according to the present invention, any reagent may be used as long as the reagent may generally release bicarbonate in water. As a specific and non-restrictive example, the bicarbonate stabilizer may be any one or two or more inorganic stabilizers selected from sodium bicarbonate ($NaHCO_3$), ammonium bicarbonate ($NH_4HCO_3$), calcium bicarbonate ($Ca(HCO_3)_2$), magnesium bicarbonate ($Mg(HCO_3)_2$), potassium bicarbonate ($KHCO_3$), barium bicarbonate ($BaHCO_3$), and the like; a protein containing phosphoric acid and sulfuric acid such as gelatin, albumin, various peptides and amino acids, or the like; buffered vitamins such as ascorbic acid, or the like; and any one or two or more organic stabilizer selected from antibiotics containing semi-synthetic penicillin such as ampicillin, amoxicillin, and the like. Among them, sodium bicarbonate is preferable that the pH of the wastewater may be easily maintained at a neutral pH.

In the present invention, an injection amount of the bicarbonate stabilizer is determined at a condition at which bicarbonate may be dissolved in the wastewater and the malachite particles may be smoothly formed in accordance with the injection of the copper ion source. As a specific example, the bicarbonate stabilizer may be injected at a concentration of 0.1 to 10 mM. In the case in which the concentration of the injected stabilizer is less than 0.1 mM, it may be difficult to form the malachite nanoparticles, and in the case in which the concentration is more than 10 mM, it may take a long time to convert the malachite particles into copper iodide in the precipitation tank.

Since the copper ion source is a source supplying copper ions for forming a copper iodide crystal, any copper salt may be used as long as it may provide the copper ion to the wastewater and be easily dissolved in water. As a specific and non-restrictive example, the copper salt used as the copper ion source may be one or two or more reagents selected from a group consisting of copper sulfate, copper acetate, copper chloride, copper bromide, copper chlorate, copper perchlorate, copper nitrite, and copper nitrate.

More preferably, the copper ion source may be copper sulfate. Copper sulfate may improve the removal efficiency of iodine as a mineralization promoter to be described below showing excellent water solubility.

In the mineralizing removal method for highly concentrated iodine in radioactive wastewater according to the present invention, it is preferable that a content of the supplied copper ion source is 1 to 1.5M based on 1M of the iodine nuclide. In the case of injecting the copper ion source so that the content of the formed copper ion is less than 1M, the copper ion capable of binding with the iodine nuclide at a ratio of 1:1 is insufficient, such that the iodine nuclide in the wastewater may not be completely removed, and in the case of injecting the copper ion source so that the content of the formed copper ion is more than 1.5M, an effect of improving iodine nuclide removing efficiency is insignificant, but the purification water may be contaminated by the excessive copper ion source.

The malachite nanoparticles may be phase-converted into copper iodide by injecting the iodine mineralization catalyst into the wastewater in which the malachite particles are formed as in step c). A precipitation process of the copper iodine mineral will be described in more detail as follows. When the iodine mineralization catalyst is injected into the wastewater in which the malachite particles are formed, iodine ions are adsorbed in a surface of the malachite. Here, a sulfate salt ($SO_4^-$), which is the iodine mineralization catalyst, induces a catalytic reaction, such that the malachite is slowly changed (phase-converted) into copper iodide (CuI) to thereby be crystallized.

As the iodine mineralization catalyst, which is to adsorb the iodine ions onto the surface of the malachite and mineralize the adsorbed iodine to thereby precipitate as copper iodine, any reagent may be used as long as it produces the sulfate salt ($SO_4^{2-}$) in the wastewater. As a specific and non-restrictive example of the iodine mineralization catalyst, any one or two or more reagents selected from sodium sulfate ($Na_2SO_4$), potassium sulfate ($K_2SO_4$), magnesium sulfate ($MgSO_4$), calcium sulfate ($CaSO_4$), ammonium sulfate (($NH_4$)$_2SO_4$), barium sulfate ($BaSO_4$), and the like may be used, but it is preferable to use sodium sulfate ($Na_2SO_4$).

An injection amount of the iodine mineralization catalyst may be 0.01 to 50 mM. Therefore, the copper iodide crystal having a coarse size may be formed to there be effectively discharged as sludge, and stability of the secondary radioactive waste, that is, copper iodide, may be significantly promoted. Preferably, a control unit may supply 0.1 to 10 mM of the iodine mineralization catalyst. In the case in which the injection amount is less than 0.01 mM, the malachite particles in the wastewater are not appropriately phase-converted, and in the case in which the injection amount is more than 50 mM, a concentration of the sulfate salt in the wastewater is increased, such that a process of additionally removing the excess sulfate salt at the time of discharging the purified wastewater may be needed.

When the sludge of copper iodine is precipitated in the wastewater as described above, the purified wastewater and the sludge may be separated and disposed. In the present invention, a separation method for sludge is not limited, but for example, methods such as a separation method after precipitation, a centrifugation method, a filtering method, a gravity thickening and dissolved air floating method, and the like, may be used.

Figure 1:
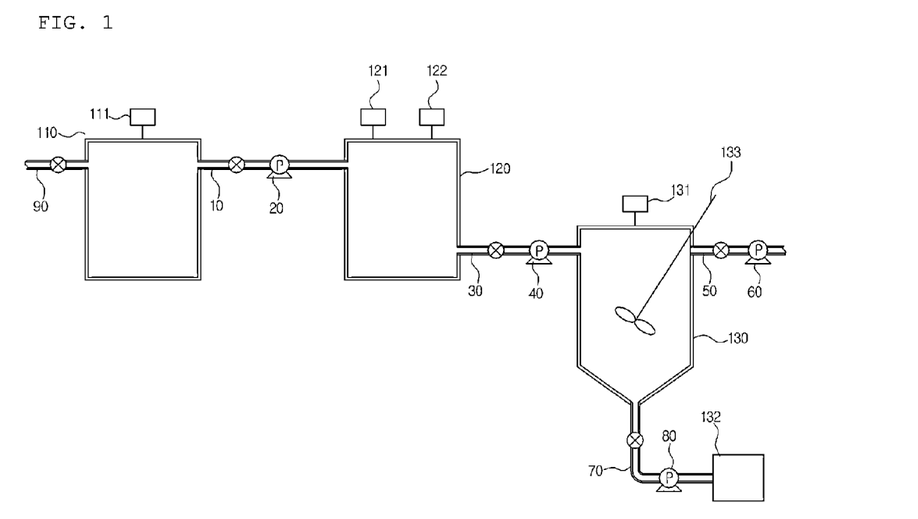
FIGS. 1 and 2 schematically show a selective removal apparatus for iodine in wastewater according to an exemplary embodiment of the present invention.

Hereinafter, the present invention will be described in detail with reference to the accompanying drawings. FIG. 1 is a configuration diagram showing a mineralizing removal apparatus for highly concentrated iodine in radioactive wastewater according to an exemplary embodiment of the present invention. As shown in FIG. 1, the mineralizing removal apparatus 100 for highly concentrated iodine in radioactive wastewater may include an anoxic tank 110, a malachite formation tank 120 connected to the anoxic tank 110, and a precipitation tank 130 connected to the malachite formation tank. In detail, based on a flow of the radioactive wastewater, the anoxic tank 110 may be provided in front of the malachite formation tank 120, and the malachite formation tank 120 may be provided in front of the precipitation tank 130.

The wastewater introduced into the anoxic tank 110 may be wastewater containing radioactive iodine, in detail, one or two or more radioactive iodine selected from iodide ion ($I^-$), iodate ion ($IO_3^-$), and iodine ($I_2$). According to the scope of the present invention of removing iodine as the crystalline mineral by the nano-crystallization technology, a concentration of the radioactive iodine in the wastewater is not particularly limited, but the radioactive wastewater introduced into the anoxic tank 110 may contain radioactive iodine (iodine nuclides) at a high concentration of 100 mM.

The anoxic tank 100 may include a wastewater inflow pipe 90 through which the wastewater is introduced from the outside, wherein the wastewater inflow pipe may be a pipe capable of being opened and closed by a valve. The anoxic tank 110 may be supplied with the radioactive wastewater to be purified to change the radioactive wastewater into an anaerobic state, and as the radioactive wastewater is changed into the anaerobic state in the anoxic tank 110, the various iodine chemical species ($IO_3^-$ and $I_2$) contained in the radioactive wastewater may be changed into a single chemical species (iodide ion ($I^-$)). In this case, the anaerobic state may mean a state in which dissolved oxygen (DO) in the wastewater is removed. In this regard, the anoxic tank 110 may be collectively referred to as an anaerobic tank 110.

In order to form the wastewater in the anaerobic state, that is, the wastewater containing the single chemical species of the iodide ion ($I^-$) as the radioactive iodine, a reducing agent may be supplied to the anoxic tank 110. In detail, the reducing agent may be supplied by a reducing agent storage tank connected to the anoxic tank 110. In this case, a general stirring device may be provided in the anoxic tank 110 in order to allow the dissolved oxygen to be effectively removed by the reducing agent, and the anoxic tank 110 may be a closed reactor capable of preventing radioactivity from being leaked to the outside.

The wastewater changed into the anaerobic state by the reducing agent may be introduced into the malachite formation tank 120. A stabilizer and a copper ion source may be supplied to the malachite formation tank 120, and the wastewater in the anaerobic state may be mixed with the stabilizer and the copper ion source in the malachite formation tank 120.

The wastewater in which malachite particles are formed by adding the copper ion source may be transferred to the precipitation tank. An iodine mineralization promoter may be supplied to the precipitation tank 130, and the iodine mineralization promoter is mixed with the wastewater containing malachite ions in the precipitation tank 130, such that a copper iodide mineral may be precipitated.

The precipitation tank may have a tapered shape in which a lower portion thereof becomes gradually narrow in order to effectively separate the precipitated copper iodide sludge and the purification water from which the radioactive iodine nuclide is removed. In this case, the tapered shape of the lower portion of the precipitation tank 130 may include a cone shape. In addition, the precipitation tank 130 may be provided with a stirrer 133 including a blade so that the iodine nuclides in the wastewater may be more rapidly removed by a nano-crystallization mechanism.

As described above, in order to unify the chemical species of the radioactive iodine in the wastewater as the iodide anion and remove the iodide anions as the copper iodide crystal by the nano-crystallization mechanism, a purification apparatus for radioactive wastewater according to the exemplary embodiment of the present invention may include a reducing agent storage tank 111 connected to the anoxic tank 110 and a stabilizer storage tank 121 and a copper ion source storage tank 122 connected to the malachite formation tank 120, respectively.

The reducing agent storage tank 111 may be connected to the anoxic tank 111 by an openable and closable pipe to store and supply the above-mentioned reducing agent itself or an aqueous solution of the reducing agent. In this case, the pipe connecting the reducing agent storage tank 111 and the anoxic tank 110 to each other may be connected to a pump for transferring of the reducing agent and supplying a fixed amount of the reducing agent.

The stabilizer storage tank 121 may be connected to the malachite formation tank 120 by an openable and closable pipe (pipe provided with a valve) to store and supply the above-mentioned stabilizer itself or water slurry or a water dispersion solution of the stabilizer. In this case, the pipe connecting the stabilizer storage tank 121 and the malachite formation tank 120 to each other may be connected to a pump for transferring the stabilizer and supplying a fixed amount of the stabilizer.

The copper ion source storage tank 122 may be connected to the malachite formation tank 120 by an openable and closable pipe (pipe equipped with a value) to store and supply the above-mentioned copper ion source itself or an aqueous solution of the copper ion source. In this case, the pipe connecting the copper ion source storage tank 122 and the malachite formation tank 120 to each other may be connected to a pump for transferring the copper ion source and supplying a fixed amount of the copper ion source.

In addition, a selective removal apparatus for iodine in radioactive wastewater according to the present invention may further include a first transfer pipe 10, a second transfer pipe 30, a purification water discharge pipe 50, a sludge discharge pipe 70, and a radioactive wastewater transfer pipe 90, which are openable and closable transfer pipes. In addition, these transfer pipes further include discharge pumps 20, 40, 60, and 80 for transferring the wastewater, the sludge, the purification water, or the like, from each of the tanks.

In detail, the selective removal apparatus for iodine in radioactive wastewater may further include the first transfer pipe 10 allowing the anoxic tank 110 and the malachite formation tank 120 to communicate with each other so as to be openable and closable; a first transfer pump 20 connected to the first transfer pipe 10 to transfer the wastewater in the anoxic tank 110 to the malachite formation tank 120; the second transfer pipe 30 installed so as to communicate with a lower portion of the malachite formation tank 120 to thereby be openable and closable; a second transfer pump connected to the second transfer pipe to transfer the wastewater in the malachite formation tank to the precipitation tank 130; the sludge discharge pipe 70 connected to the precipitation tank 130 to discharge the precipitated copper iodide; and the sludge discharge pump 80 connected to the sludge discharge pipe 70 to discharge the sludge in the precipitation tank 130. In addition, the selective removal apparatus for iodine in radioactive wastewater may further include the purification water discharge pipe 50 installed so as to communicate with the precipitation tank 130 to thereby be openable and closable; and the purification water discharge pump 60 connected to the purification water discharge pipe 50 to discharge the purification water from which the iodine nuclide is removed.

One end of the first transfer pipe 10 is coupled to the anoxic tank 110 and the other end thereof is coupled to the malachite formation tank 120, such that the first transfer pipe 10 provides a pathway through which the wastewater in the anaerobic state is transferred from the anoxic tank 110 to the malachite formation tank 120. The first transfer pipe 10 may be a transfer pipe provided with the valve adjusting an opening and closing of the pipe so as to prevent the wastewater from moving to the malachite formation tank 120 while the radioactive wastewater is introduced into the anoxic tank 110 and changed into the anaerobic state while maintaining a predetermined water level, and allow the wastewater in the anaerobic state to move to the malachite formation tank 120. The first transfer pump 20 may be connected to the first transfer pipe 10 to move the wastewater in the anaerobic state from the anoxic tank 110 to the malachite formation tank 120 through the first transfer pipe 10.

The malachite formation tank 120 is connected to the anoxic tank 110 through the first transfer pipe, and when the wastewater in the anaerobic state is introduced from the anoxic tank, the wastewater in the anaerobic state is mixed with the stabilizer and the copper ion source stored in the stabilizer storage tank and the copper ion source storage tank, such that the malachite particles are formed. In addition, the second transfer pipe 30 communicating with a lower end portion of the malachite formation tank 120 may be a transfer pipe provided with a valve adjusting an opening and closing of the pipe so as to prevent the wastewater in the anaerobic state from moving to the precipitation tank 130 while the radioactive wastewater is introduced into the malachite formation tank 120 to form the malachite particles while maintaining a predetermined water level, and allow the wastewater in which formation of the malachite particles is terminated to move to the precipitation tank 130. The second transfer pump 40 may be connected to the second transfer pipe 30 to move the wastewater containing the malachite particles from the malachite formation tank 120 to the precipitation tank 130 through the second transfer pipe 30.

The anionic iodine nuclide ($I^-$) in the radioactive wastewater may be removed as the copper iodide crystal in the precipitation tank 130. Therefore, the radioactive iodine nuclide is precipitated at a lower portion of the precipitation tank 130 to form the sludge, and the sludge containing the copper iodide crystal is discharged and removed through the sludge discharge pipe 70 installed so as to communicate with the lower portion of the precipitation tank 130 to thereby be openable and closable. In detail, the sludge discharge pipe 70 may include the valve adjusting an opening and closing of the pipe, and one end thereof may be connected to the lower portion of the precipitation tank 130 and the other end thereof may be connected to a sludge storage tank 132 storing the discharged sludge. The sludge discharge pump 80 may be connected to the sludge discharge pipe 70 to move the sludge precipitated at the lower portion of the precipitation tank 130 to the sludge storage tank 132 through the sludge discharge pipe 70. In this case, the front of the sludge storage tank 132 may be further provided with a dehydration tank (not shown) dehydrating the sludge discharged through the sludge discharge pipe, and the sludge dehydrated by the dehydration tank may be introduced into and stored in the sludge storage tank 132. In this case, the dehydrated sludge may be finally disposed as a solid phase radioactive waste.

The radioactive iodine nuclide in the wastewater is phase-converted into copper iodide, such that the sludge is formed at the lower portion of the precipitation tank 130, and the purification water from which the radioactive iodine nuclide is removed is formed over the sludge. The purification water may be discharged through the openable and closable purification water discharge pipe 50 connected to the precipitation tank 130 and the purification water discharge pump 60. Since the pH of the wastewater may be maintained at the nearly neutral state, and water quality deterioration by materials injected into the precipitation tank 130 in order to remove the iodine nuclide may be prevented, the discharged purification water may be directly discharged or reused.

In order to prevent the radioactivity from being leaked and safely remove the radioactive nuclides, it is preferable that the purification of the wastewater is automatically performed. In the purification apparatus for radioactive wastewater according to an exemplary embodiment of the present invention, the iodine nuclide in the wastewater is removed as the crystalline mineral using the nano-crystallization mechanism of the mineralization promoter after removing oxygen present in the radioactive wastewater, such that automation of the apparatus is significantly easy.

Figure 2:
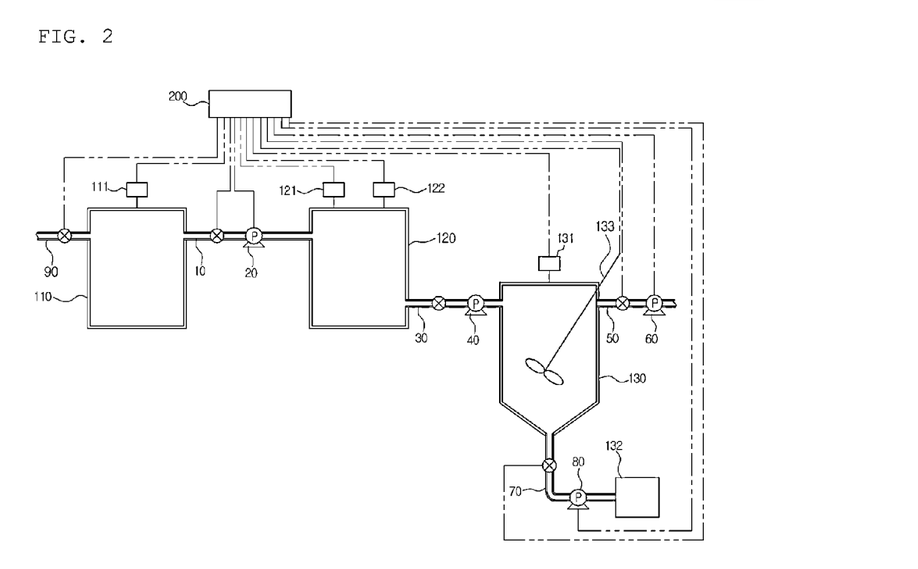

FIG. 2 is another configuration diagram of the purification apparatus for radioactive wastewater according to an exemplary embodiment of the present invention. As shown in FIG. 2, the purification apparatus for radioactive wastewater according to the present invention may further include a control unit 200 controlling the transferring of the radioactive wastewater, the injecting of each of the materials used for purification of the radioactive wastewater, and the discharging of the sludge and purification water.

In detail, the control unit 200 may control an openable and closable radioactive wastewater inflow pipe 90 connected to the anoxic tank 110, which is a closed tank, to adjust whether or not the radioactive wastewater is introduced and an amount of the radioactive wastewater in the anoxic tank 110, and control the first transfer pipe 10 and the first transfer pump 20 to control whether or not the wastewater is transferred from the anoxic tank 110 to the malachite formation tank 120, which is a closed tank. After a predetermined amount of radioactive wastewater is introduced into the anoxic tank 110 by the control unit 200, the control unit 200 may control a transfer pipe and pump of the reducing agent storage tank 111 so that a predetermined amount of the reducing agent is injected from the reducing agent storage tank 111 into the anoxic tank 110.

After the radioactive wastewater is changed into the anaerobic state in the anoxic tank 110, the control unit 200 may control the first transfer pipe 10 and the first transfer pump 20 to move the wastewater in the anaerobic state from the anoxic tank 110 to the malachite formation tank 120. Thereafter, the control unit 200 may control the opening and closing of the transfer pipe of each of the storage tanks 121 and 122 and an operation of the pump so that predetermined amounts of the stabilizer and the copper ion source from the stabilizer storage tank 121 and the copper ion source storage tank 122 to the malachite formation tank 120.

The control unit 200 may control the opening of the transfer pipe of each of the storage tanks 121 and 122 and the operation of the pump so that the stabilizer and the copper ion source may be sequentially injected at the time of forming bicarbonate and the malachite particles in the wastewater.

The control unit 200 according to the present invention may introduce the copper ion source to the malachite formation tank 120 so as to react with bicarbonate dissolved in the radioactive wastewater to thereby form the malachite particles.

After the malachite particles are formed in the malachite formation tank 120, the control unit 200 controls the second transfer pump 30 and the second transfer pump 40 to move the wastewater containing the malachite particles from the malachite formation tank 120 to the precipitation tank 130. Then, the control unit 200 may control the opening and closing of a transfer pipe of a mineralization promoter storage tank 131 and an operation of a pump so that a predetermined amount of the mineralization promoter is injected from the storage tank 131 into the precipitation tank 130.

After the radioactive iodine nuclide is precipitated as the sludge by the nano-crystallization mechanism by the mineralization promoter in the precipitation tank 130 and purification of the wastewater is completed, the control unit 200 may control the sludge discharge pipe 70 and the sludge discharge pump 80 to separate and discharge the sludge precipitated at the lower portion of the precipitation tank 130, and then control the purification water discharge pipe 50 and the purification water discharge pump 60 to discharge the purification water from which the radioactive nuclide is removed.

As described above, the control unit 200 may introduce the radioactive wastewater into the anoxic tank 110, inject the reducing agent into the anoxic tank 110 to change the radioactive wastewater into the anaerobic state, transfer the radioactive wastewater in the anaerobic state to the malachite formation tank 120, and sequentially inject (supply) the stabilizer and the copper ion source into the malachite formation tank 120, thereby making it possible to form the malachite particles. In addition, the control unit 200 may transfer the wastewater in the malachite formation tank to the precipitation tank 130, inject the mineralization promoter to precipitate the malachite particles as the copper iodide sludge by phase-conversion of the malachite particles, and separate and discharge each of the sludge and the purification water from which the iodine nuclide is removed through each of the outlets provided in the precipitation tank 130, respectively.

In this case, when stirring units are provided in the anoxic tank 110, the malachite formation tank 120, and the precipitation tank 130, respectively, the control unit 200 may control each of the stirring units so as to perform the stirring while the wastewater is changed into the anaerobic state in the anoxic tank 110, while the malachite particles are formed in the wastewater in the anaerobic state in the malachite formation tank 120, and the copper iodide is formed by the nano-crystallization mechanism in the precipitation tank. In addition, the control unit 200 may stop the operation of each of the stirring units to maintain at a stationary state for a predetermined time so that precipitation is performed after the radioactive iodine nuclide is removed by the nano-crystallization mechanism. However, the case in which the stirrer 133 is provided only in the precipitation tank is shown in FIGS. 1 and 2, but the stirrer may be provided in both of the malachite formation tank and the anoxic tank as well as the precipitation tank, and the present invention is not limited thereto.

In consideration of the content of the iodine nuclide in the radioactive wastewater, an amount of treated radioactive wastewater (a treatment volume, that is, sizes of the anoxic tank, the malachite formation tank, and the precipitation tank), or the like, a time for the anaerobic state, a time for forming malachite, a time for performing the nano-crystallization mechanism, a time for stationary state for precipitation as the sludge, and the like, may be determined. As a specific and non-restrictive example, based on wastewater containing 1 mM radioactive iodine and a wastewater treatment volume of 1 ton, the control unit 200 may supply the reducing agent to the anoxic tank 110 and change the wastewater into an anaerobic state for 1 to 5 hours, supply the stabilizer and copper ion source to the malachite formation tank 120 and form iodide malachite particles while stirring for 5 to 24 hours, and perform phase-conversion of the malachite particles for 24 to 48 hours to thereby precipitate the malachite particles as the copper iodide sludge in the precipitation tank. In addition, the control unit 200 may control the anoxic tank 110, the malachite formation tank 120, and the precipitation tank 130 to be in stationary state for 2 to 12 hours while forming the sludge so that the sludge is precipitated in the lower portion of the precipitation tank 130.

Further, for continuous purification of the wastewater, the control unit 200 may control each of the anoxic tank 110, the malachite formation tank 120, and the precipitation tank so that the radioactive wastewater is changed into the anaerobic state in the anoxic tank 110 or the malachite particles are formed in the malachite formation tank 120 while purification by the nano-crystallization mechanism is performed in the precipitation tank 130 after the wastewater in the anaerobic state is moved from the anoxic tank 110 to the malachite formation tank 120 or the wastewater containing the malachite particles formed therein is moved from the malachite formation tank 120 to the precipitation tank 130, respectively.

Hereinafter, the present invention will be described in detail through the following Example.

(Example)

Figure 3:
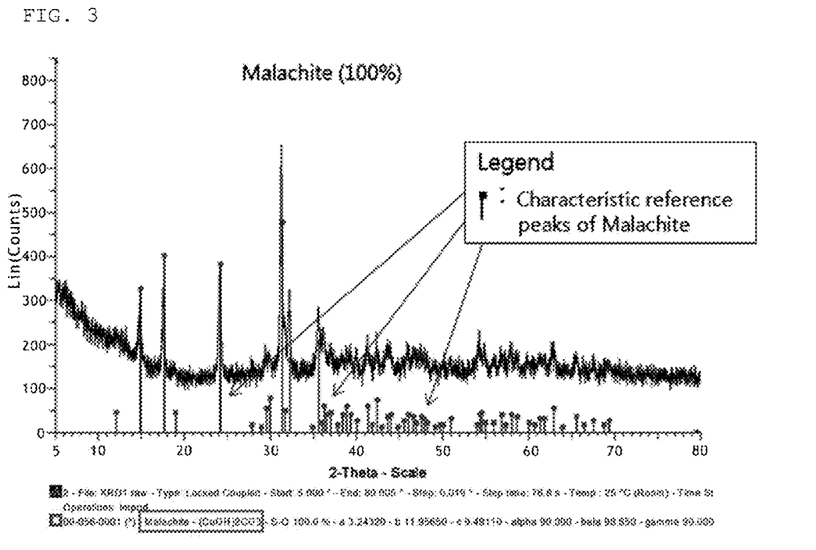
FIG. 3 shows an X-ray diffraction pattern of malachite nanoparticles according to an exemplary embodiment of the present invention.

A 100 ml of wastewater was prepared by adding 1 mM iodide (NaI) to a solution in which 1 mM chlorine component (NaCl), which is a competitive ion, was dissolved. After the prepared wastewater was purged with $N_2$ gas for 40 minutes to thereby be in an anaerobic state, 3 mM bicarbonate ($NaHCO_3$) and 1 mM copper ($CuN_2O_6.3H_2O$) were added thereto and stirred at 120 rpm for 24 hours. A blue precipitate started to be formed during a stirring process and as a result of X-ray diffraction (XRD) analysis of the formed precipitate as shown in FIG. 3, it was confirmed that the formed precipitate is 100% malachite.

After the malachite precipitate was formed, 1 mM sodium sulfate ($Na_2SO_4$) was added thereto and stirred for 48 hours, the malachite was gradually converted into a white crystal. The finally crystallized white precipitation mineral was analyzed by an X-ray diffractometer, and as a result, it was confirmed that phase-conversion into 100% copper iodide (CuI) was performed as shown in FIG. 4, and it was confirmed that initial malachite was phase-converted into copper iodide.

Figure 4:
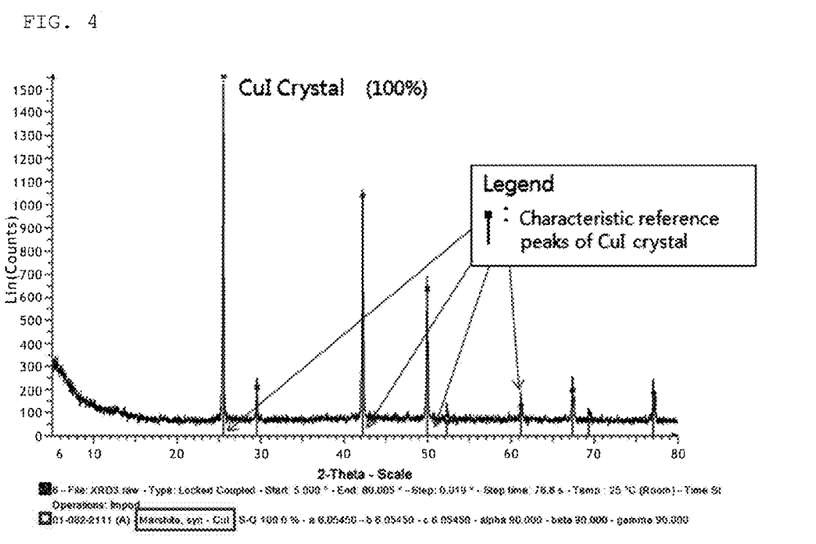
FIG. 4 shows an X-ray diffraction pattern of a copper iodide crystal according to an exemplary embodiment of the present invention.
Figure 5:
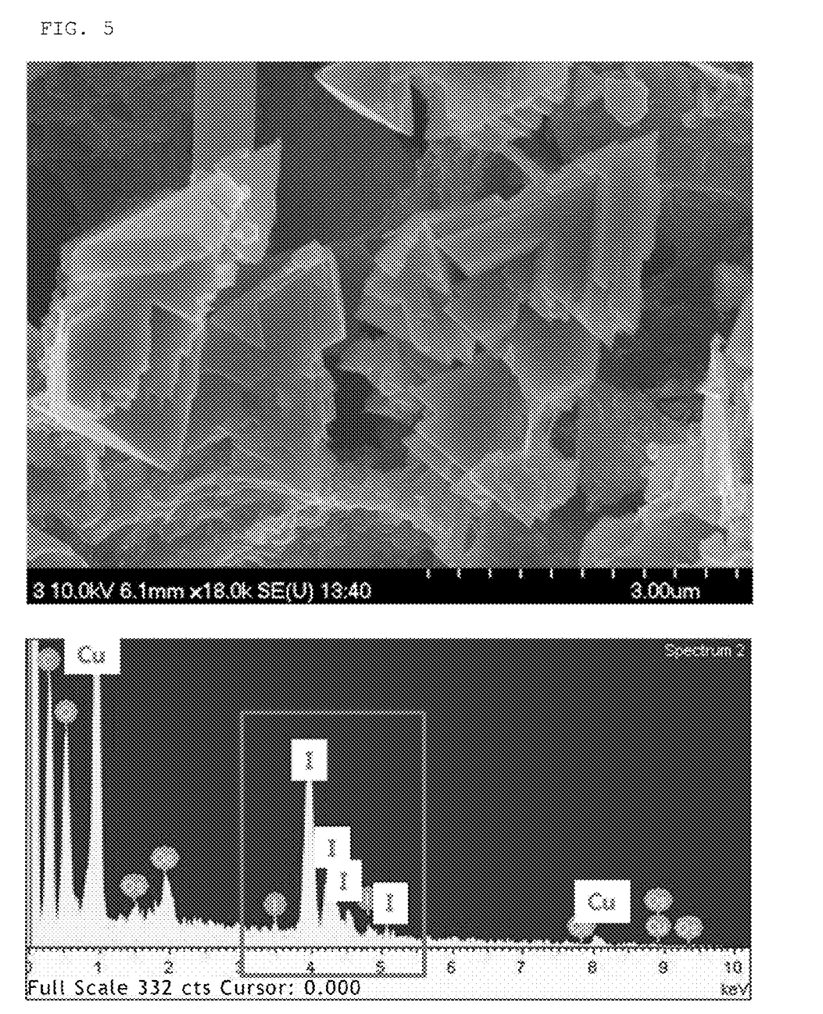
FIG. 5 shows a scanning electron microscopy (SEM) photograph and an energy dispersive spectrometry spectrum result of the copper iodide crystal according to an exemplary embodiment of the present invention.

The copper iodide (CuI) confirmed by the X-ray diffraction analysis in FIG. 4 was observed by a scanning electron microscope and analyzed using energy dispersive spectrometry (EDS), and as a result, it was confirmed that the iodide ions dissolved in the wastewater at an initial stage of the experiment grew and were crystallized into a coarse copper iodide mineral having a size of several μm or more.

In the mineralizing removal method and apparatus for highly concentrated iodine in radioactive wastewater according to the present invention, since only a small amount of sludge is discharged as compared to the existing treatment methods, the generation amount of the radioactive waste may be significantly decreased, such that wastewater containing highly concentrated iodine may also be effectively treated. Further, only iodine may be selectively removed regardless of the presence of competitive ions in the wastewater, and treatment may be performed under the neutral or weak alkaline condition rather than the existing acidic condition, such that at the time of discharging wastewater, a neutralization treatment process is not required.

In addition, long-term storage stability of the radioactive waste may be significantly increased by the crystallization method as compared to the existing methods.

Hereinabove, although the present invention is described by specific matters, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described embodiments, and the following claims as well as all modified equally or equivalently to the claims are intended to fall within the scope and spirit of the invention.

What is claimed is:

1. A mineralizing removal method for highly concentrated iodine in radioactive wastewater, the mineralizing removal method comprising:
   a) injecting a reducing agent into wastewater containing radioactive iodine in an anoxic tank to prepare anaerobic wastewater;
   b) injecting a stabilizer and a copper ion source into the anaerobic wastewater to form malachite nanoparticles;
   c) injecting an iodine mineralization catalyst to the wastewater in step b) to phase-convert the malachite nanoparticles into copper iodide and grow a crystal; and
   d) separating the copper iodide from purified wastewater.

2. The mineralizing removal method of claim 1, wherein the reducing agent is any one or two or more reagents selected from oxalic acid, formic acid, sodium sulfite, and sodium hydrogen sulfite.

3. The mineralizing removal method of claim 1, wherein the stabilizer is any one or two or more reagents selected from sodium bicarbonate, ammonium bicarbonate, calcium bicarbonate, magnesium bicarbonate, potassium bicarbonate, barium bicarbonate, protein, vitamins, and antibiotics.

4. The mineralizing removal method of claim 1, wherein the iodine mineralization catalyst is any one or two or more reagents selected from sodium sulfate, potassium sulfate, magnesium sulfate, calcium sulfate, ammonium sulfate, and barium sulfate.

* * * * *